June 5, 1956 L. B. COURTOT 2,749,152
SHORT TUBE COUPLING WITH DEFORMABLE EDGES
Filed Nov. 13, 1952 2 Sheets-Sheet 1

INVENTOR.
LOUIS B. COURTOT
BY RICHEY, WATTS, EDGERTON & McNENNY
ATTORNEYS

June 5, 1956 — L. B. COURTOT — 2,749,152
SHORT TUBE COUPLING WITH DEFORMABLE EDGES
Filed Nov. 13, 1952 — 2 Sheets-Sheet 2

INVENTOR.
LOUIS B. COURTOT
BY RICHEY, WATTS, EDGERTON & McNENNY
ATTORNEYS

United States Patent Office 2,749,152
Patented June 5, 1956

2,749,152

SHORT TUBE COUPLING WITH DEFORMABLE EDGES

Louis B. Courtot, Cleveland, Ohio, assignor to The Weatherhead Company, Cleveland, Ohio, a corporation of Ohio Application November 13, 1952, Serial No. 320,215

3 Claims. (Cl. 285—120)

This invention relates to pipe or tube couplings, and more specifically to couplings commonly referred to as short couplings, that is couplings wherein the tube and coupling elements may be positioned and aligned for tightening of the coupling by sliding the tubes together laterally without requiring appreciable relative axial motion.

Installation conditions are often encountered wherein the tubes or pipes to be coupled are not easily flexed or extend but a short distance from rigid bodies that limit their axial motion. Under these circumstances it is necessary to have a coupling that may be assembled by bringing the parts together laterally. However, in installations wherein high pressures are encountered or wherein vibratory force must be resisted or both, then it is desirable to employ a coupling having action like that described in the patent to Kreidel 2,211,856. This coupling is exceedingly effective and requires no preliminary preparation of the tube. It depends for its action upon the application of radial force adjacent the cutting edge formed on a sleeve surrounding the tube, whereupon as the nut is tightened upon the body member of the fitting the sleeve advances axially along the tube and is compressed radially thereagainst so that the cutting edge of the sleeve bites into and shears up the metal of the tube forming a strong mechanical joint as well as a perfect seal.

Prior workers with the Kreidel-type of fitting have incorporated a deep internal flaring surface in the fitting body for reaction against the sleeve to cause the aforesaid radial compression of the sleeve and the shearing and cutting action of its cutting edge. While this is satisfactory in many applications, it must be noted that to disassemble the fitting after the nut is loosened the tube must be withdrawn axially by at least the total axial extent of the flaring surface in the body necessary to contract the sleeve about the tube. Thus, in installations like those described where the tube is very rigid or where it extends but a short distance from its support there is not available enough axial motion of the tube to withdraw it from the fitting body of the conventional Kreidel-type coupling.

Accordingly, the principal object of the present invention resides in the provision of what is called a short coupling, that is, a coupling wherein little or no axial motion of the tube is required to free it from the fitting body, and which at the same time has the advantages and mode of operation of the Kreidel-type coupling. Briefly, this is accomplished by forming the fitting body with an end surface which, as compared to the recessed end of the Kreidel fitting, is substantially square or radial insofar as restraint of lateral motion of the tube and the cutting sleeve is concerned although it has a shallow groove or a shallowly tapered shoulder. The contraction of the cutting sleeve about the tube is accomplished by an adaptor having a nose engaging the groove or shoulder in the body and a relatively deep recess for contracting the cutting ring. This proposes a problem not found in Kreidel construction, namely the production of sealing action between the relatively square-ended fitting body and the adaptor for the cutting sleeve to prevent fluid which might leak past the end of the tube from finding its way exteriorly of the sleeve into the space bounded by the threads of the nut. When the nut is tightened with the parts assembled the adaptor nose is resiliently deformed by the fitting groove or tapered shoulder to make sealing contact therewith. The last deformation does not strain the adaptor nose past its elastic limit so that it springs back slightly if the coupling is disconnected and so can be reconnected many times without producing leakage. Also, the nose is elastically pressed against the body groove or shoulder when the fitting is set up which augments the seal and resists vibration.

It is another object of the invention to improve the sealing action between the end of the tube and the fitting body. This is accomplished by providing a tapered surface of limited axial extent that forms an abutment for the end of a squarely cut tube, causing the tube to flare outwardly in response to axial pressure of the cutting ring and make intimate engagement with the end of the fitting body. For example, the end of the fitting may be formed with a shallow V-shaped groove into which a lip on the adaptor means extends as well as the square tube end. When the nut is tightened the end of the tube flares to compress the lip outwardly against the wall of the body groove.

Since the radial thickness of the adaptor is limited, and since the expansive force of the cutting ring is relatively high, it is desirable if means can be provided for limiting the strain of the adaptor. This is accomplished by the cooperation of the radially outer wall of the sealing groove in the body and a lip on the adaptor member which wall backs up the member and resists expansion and splitting thereof as the coupling is tightened. This permits the adaptor, or sleeve member that contracts the cutting edge into the tube to be made of small radial dimensions and inexpensive material.

The manner in which these and other objects may be accomplished will be apparent from the following detailed description of a preferred form of the invention.

Figure 1:
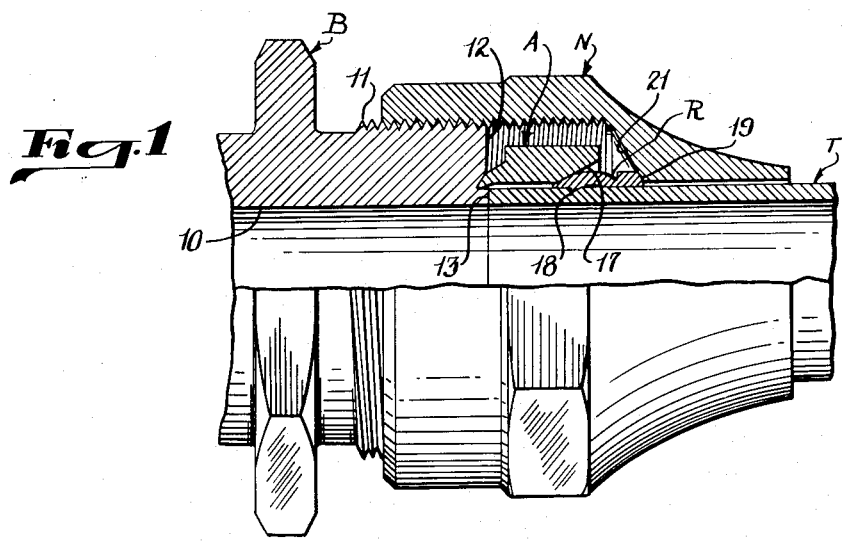
Fig. 1 is a section through one form of coupling after the parts have sealed.
Figures 2, 3:
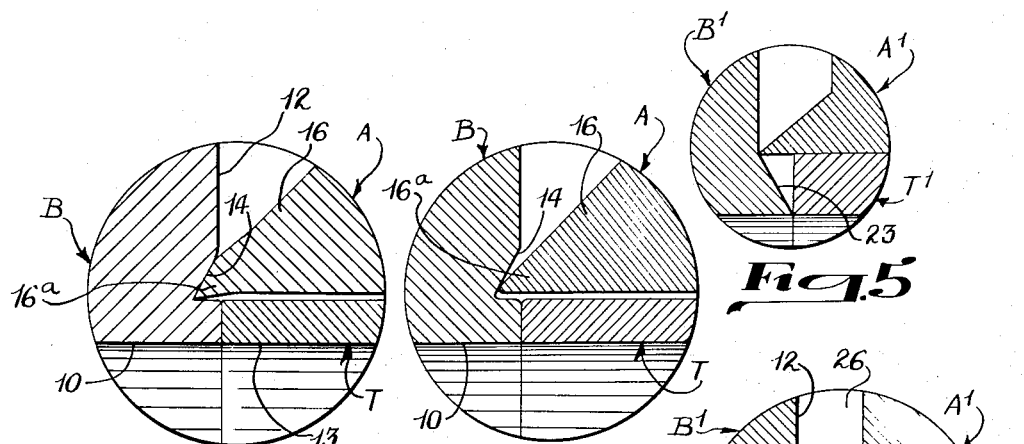
Fig. 2 is an enlarged fragmentary section of the parts when the nut is loose.
Fig. 3 is an enlarged fragmentary section to more clearly illustrate the sealing action between the body and the adaptor when the nut is tightened.

Referring to Figs. 1, 2, and 3 the fitting in this form of the invention includes the fitting body B and nut N, tube gripping sleeve means which in the form shown comprise the adaptor A, and a tube gripping and cutting ring R. A tube T is also shown in position although it is of conventional shape and forms no part of the invention. In the form shown, the ring or sleeve R closely resembles the Kreidel-type of ring previously referred to, yet the structure is such that although the ring is compressed about the tube in its usual manner the parts are readily separated with small relative axial motion between the tube and body.

To produce this operation the body B is formed differently from the Kreidel-type body. It includes fluid conducting bore 10 and threads 11 for cooperation with the usual fitting nut N. The end face of the fitting includes a radial face 12 leading from the threads, an aligned, generally-radial face 13 which acts as a tube abutment shoulder, and a shallow, circumferential, V-shaped groove outwardly of shoulder 13 which includes radially inwardly facing tapered wall portion 14. The adaptor A is an annular member having a forwardly extending lip portion 16 and is arranged to seat within the groove in the end face of the body. Formed in the other end of the adaptor A is an internal tapered surface 17 which is similar in shape and function to the internally tapered surface normally formed in the body of the Kreidel-type fitting for compression of the cutting edge of the ring into the material of the tube. The ring R is a thin-walled sleeve-like member having a cutting edge 18 and a bevelled rearward portion 19 for engagement by a tapered wall 21 of the nut N.

When the parts are assembled as shown in the figure and the nut N is tightened on the body, two actions occur substantially simultaneously. First, there is a tube-shearing and gripping action which results from the radial compression of the ring R adjacent its cutting edge 18 combined with its axial motion within the long, shallow taper 17 in the adaptor A. This causes the ring to cut into and shear up metal of the tube and simultaneously force the tube against the shoulder 13 and urge the lip portion 16 of the adaptor A into intimate sealing engagement with the wall 14 of the V-shaped groove in the fitting body B. As seen in Fig. 3, the extremity 16a of adaptor nose 16 is contracted radially inwardly and mushroomed somewhat by the outer wall 14 of the groove in the fitting body. It is noted that the connection between the body and the adaptor has an inherent resilience because the nose portion 16a as well as the tube end will not be entirely deformed beyond their elastic limits. Any fluid which might leak past the end of the tube is trapped by the lip portion 16a of the adaptor in sealing engagement with the wall 14 of the groove in the body. Also, if the fitting is disconnected the lip and tube ends will spring back slightly toward their original shape and so provide for resilient reconnection.

As compared with the tapered throat required to deform the cutting of the ring into the tube, the depth of the groove in the body that receives the adaptor is small. For example, when employed to couple ½" tubing, the axial depth of the groove in the body may be in the neighborhood of $\frac{1}{32}$ of an inch. Although a groove of this size will provide adequate sealing action, ordinarily the parts may be sprung enough to permit separation of the tube from the fitting body under conditions wherein a short coupling is required.

It is noted that the adaptor A must be considerably smaller in thickness than the coupling body, the latter elements being that which stands the expansive force of the cutting ring in the Kreidel construction. This imposes severe stress on the adaptor but the strain resulting therefrom is held to workable limits by the restraining or backing up action of the outer wall 14 of the groove against the lip of the adaptor. This permits the adaptor to be made small enough to lie within the confines of a fitting nut without resort to heat-treated or high tensile strength materials for fabrication of the adaptor.

Figure 5:
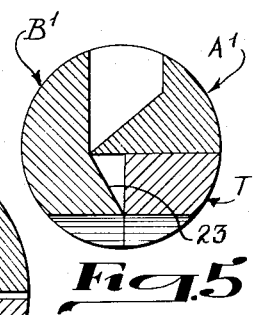
Fig. 5 shows an enlarged fragmentary section of the form shown in Fig. 4 before tightening and Fig. 6 after tightening.
Figure 4:
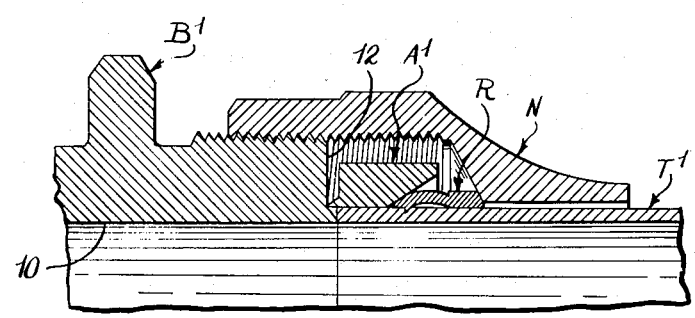
Fig. 4 shows a modified form of the invention.
Figure 6:
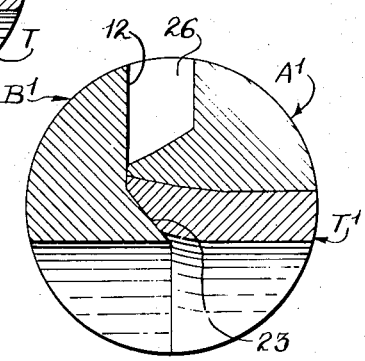

In the form shown in Figs. 4 to 6, the action is similar to that just described but the end face of the body $B_1$ is not grooved; rather, the tube abutment surface 23 instead of being square and parallel with the radial surface 12 is generally conical and faces radially and axially outwardly intersecting the radial surface 12 of the body. As in the form previously described, a lip 26 for making sealing engagement with the parts is provided on the adaptor $A_1$. The tube cutting sleeve R and the nut N are unchanged.

As seen in Fig. 6 when this form of fitting is tightened the end of the tube is expanded or flared so that it not only makes firm, but resilient engagement with the body surface, but is pressed against the lip 26 of the adaptor. Thus, a tube sealing action is effected at the forward end of the adaptor in that the tube is held firmly against the end of the fitting body by the restraining force of adaptor lip 26, and as effected in the previously described embodiment the lip 26 itself makes sealing engagement with the end surface of the fitting body. As with the groove described in the previous embodiment, the axial extent of the tapered wall 23 may be small, in the neighborhood of $\frac{1}{32}$ of an inch for a ½" coupling, so that very little axial separation of the parts is required for the coupling to be disconnected.

Figure 7:
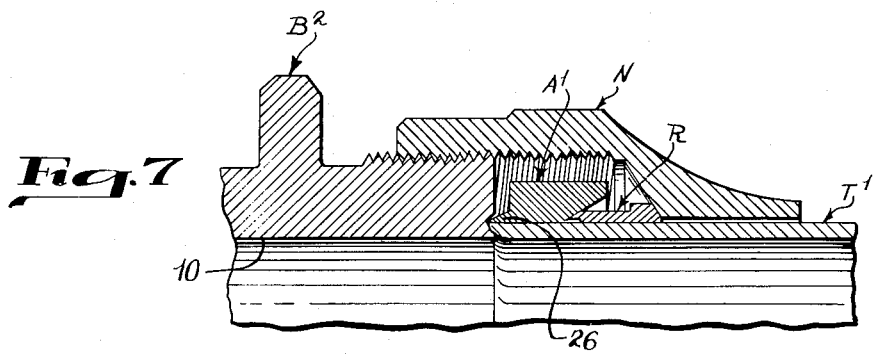
Fig. 7 shows another form of the invention.
Figure 9:
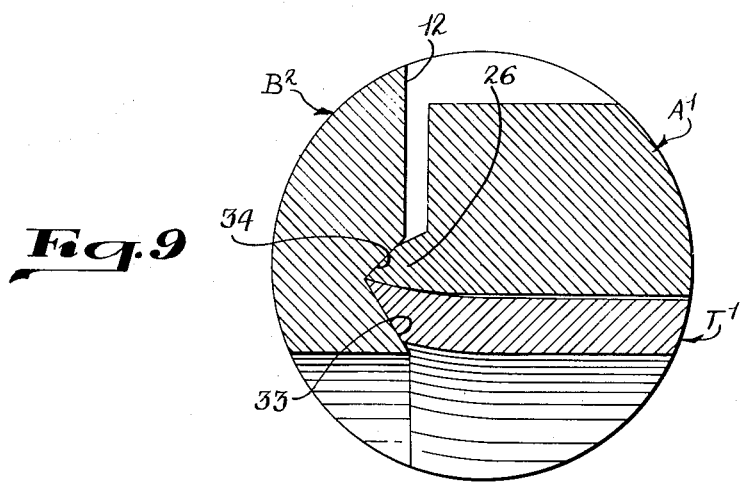
Figure 8:
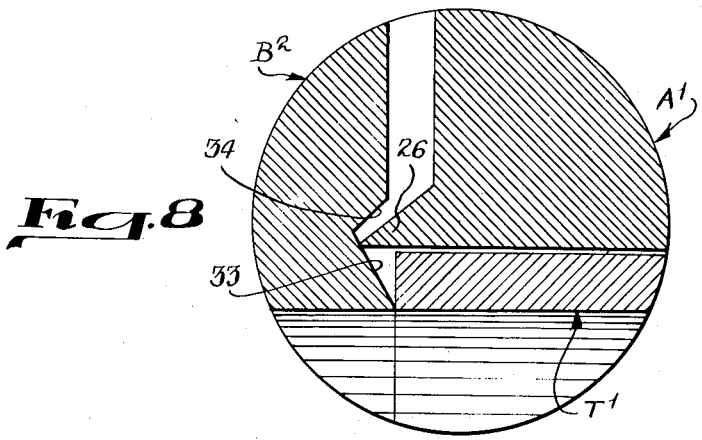
Fig. 8 is an enlarged view of the same form before tightening and Fig. 9 after tightening.

The form shown in Figs. 7 to 9 has some of the attributes of both the previously described forms. Here in close axial alignment with the radial surface 12 of the fitting body is a V-shaped groove having an outwardly facing tapered tube abutment surface 33 and an inwardly facing tapered wall 34. When the fitting is tightened, the cutting ring R, which may be of the conventional Kreidel construction, urges both the adaptor $A_1$ and the tube $T_1$ forwardly. The tapered abutment surface 33 for the tube causes the end thereof to flare outwardly and firmly and resiliently engage the lip 26 on the adaptor $A_1$ which is firmly and resiliently pressed against the wall 34 of the groove. In this construction an exceedingly effective sealing action is obtained between the tube and the body, between the tube and the lip 26 of the adaptor, and between the lip 26 of the adaptor and the body. As in the form shown in Figs. 1 to 3, the wall 34 of the groove backs up the forward end of the adaptor ring and tends to prevent splitting thereof. Also, there is a residual resiliency in the nose 26 and the tube end which permits reconnection many times and resists vibration. The axial extent of the groove in the end of the body may, as in the other forms, be relatively small so that the coupling may act as a short coupling in all except the most rigid of installations.

In conclusion it can be seen that I have provided a short coupling which may be disconnected with little or no relative axial motion of the tube and the body, and yet which combines all the advantages of the Kreidel construction which provides an excellent seal against fluid pressure, a strong mechanical joint, a resilient vibration-proof joint, and a joint that can be formed without preliminary preparation of the tube or other coupling elements.

Having completed a detailed explanation of the invention to enable those skilled in the art to practice the same, it will be understood that various modifications thereof may be made without departing from the scope of the invention as defined in the appended claims.

What is claimed is:

1. In a coupling, a body member having a fluid conducting bore, a tube-end abutment surface formed on said one end of the body member, a V-shaped annular groove in the end of said body outwardly of said abutment surface providing an inclined surface, a first sleeve having a portion for gripping a tube, a second sleeve having a forward end portion including a deformable lip adapted to engage said inclined surface and be inwardly displaced thereby, said sleeves being axially movable relative to said tube, the other end of said second sleeve having a flaring surface overlying the tube-gripping portion of said first sleeve, a clamp member adjustably connected to said body member for engaging the other end portion of said first sleeve to force the forward end thereof against the flaring surface of the second sleeve and to force the lip of the second sleeve against the radially outer surface of the groove in said body member to resist splitting of the second sleeve from the reaction of the first sleeve against said flaring surface and to deform and radially displace said lip into sealing engagement with the body, the radial displacement of the lip causing relative motion between the lip and body after engagement to provide a surface seal therebetween.

2. In a coupling, a body member having a fluid conducting bore, one end of said body member forming a generally radial surface extending inwardly from the periphery of the body member, a generally conical tube-end abutment surface formed on said one end of the body member and facing axially and radially outwardly, said abutment surface being adjacent said body bore and substantially in axial alignment with said generally radial end surface, sleeve means including a cutting edge for shearing up material of a tube and a forward end portion for engaging said one end of the body member, said sleeve means being axially slidable relative to said tube, said forward sleeve portion including a deformable lip for sealing engagement with said one end of the body member, a clamp member adjustably connected to said body member for engaging the other end portion of said sleeve means to force the lip thereof against the body member to deform and radially displace the lip into sealing engagement with said body, the radial displacement of the lip causing relative motion between the lip and body after engagement to provide a surface seal therebetween, and means in said coupling to deform said cutting edge of the sleeve means radially into tube engagement in response to axial motion of said clamp means, said conical tube abutment surface being adapted to flare the end of a tube outwardly into engagement with said lip.

3. In a coupling, a body member having a fluid conducting bore, one end of said body member forming a generally radial surface extending inwardly from the periphery of the body member, a shallow V-shaped groove in said body adjacent the bore therein and in substantial alignment with said radial surface, said groove having a generally conical tube-end abutment surface adjacent said body bore and facing axially and radially outwardly, a first sleeve having a cutting edge for gripping and shearing up material of a tube, a second sleeve having a forward end portion including a deformable lip having an unstressed diameter less than the diameter of the outer wall of the V-shaped groove, said sleeves being axially movable relative to said tube, the other end of said second sleeve having a flaring surface overlying the tube-gripping portion of said first sleeve, a clamp member adjustably connected to said body member for engaging the other end portion of said first sleeve to force the tube and second sleeve forward thereby expanding the end of a tube into sealing engagement with the said lip and deform and radially displace the lip into sealing engagement with the radially outer wall of said groove, the radial displacement of the lip causing relative motion between the lip and body after engagement to provide a surface seal therebetween.

References Cited in the file of this patent

UNITED STATES PATENTS

| Re. 23,157 | Kane | Oct. 25, 1949 |
| 2,188,006 | Katcher | Jan. 23, 1940 |
| 2,211,856 | Kreidel | Oct. 20, 1940 |
| 2,394,351 | Wurzburger | Feb. 5, 1946 |
| 2,466,526 | Wolfram | Apr. 5, 1949 |
| 2,687,315 | Courtot | Aug. 24, 1954 |

FOREIGN PATENTS

| 691,001 | Germany | Nov. 24, 1933 |